United States Patent
Kurpejovic et al.

(10) Patent No.: US 11,156,142 B2
(45) Date of Patent: Oct. 26, 2021

(54) EXHAUST SYSTEM

(71) Applicant: Eberspächer Exhaust Technology GmbH, Neunkirchen (DE)

(72) Inventors: Enver Kurpejovic, Kirchheim (DE); Marc Palinkas, Aichtal (DE); Thomas Wolf, Esslingen (DE); Krishna Siva Prasad Reddy Yenugula, Esslingen (DE); Ruben Hass, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 16/736,021

(22) Filed: Jan. 7, 2020

(65) Prior Publication Data

US 2020/0217232 A1    Jul. 9, 2020

(30) Foreign Application Priority Data

Jan. 8, 2019   (DE) ..................... 10 2019 100 302.4
Feb. 26, 2019  (DE) ..................... 10 2019 104 772.2

(51) Int. Cl.
*F01N 3/20*    (2006.01)
*F01N 3/28*    (2006.01)
(Continued)

(52) U.S. Cl.
CPC ......... *F01N 3/2066* (2013.01); *B01D 53/944* (2013.01); *B01D 53/9431* (2013.01);
(Continued)

(58) Field of Classification Search
CPC ........ B01D 2251/2067; B01D 53/9431; B01F 2005/0091; B01F 3/04049; B01F 5/0451;
(Continued)

(56) References Cited

U.S. PATENT DOCUMENTS 10,138,776 B2 *  11/2018  Hatakeyama ......... F01N 3/0222
10,184,433 B2 *   1/2019  Ferront ................. F01N 3/2892
(Continued)

FOREIGN PATENT DOCUMENTS

CN    105089749 A    11/2015
CN    106194348 A    12/2016
(Continued)

OTHER PUBLICATIONS

DE102016114283A1_Translation ; Feb. 8, 2018; Konig Tobias.*

*Primary Examiner* — Jesse S Bogue
(74) *Attorney, Agent, or Firm* — McGlew and Tuttle, P.C.

(57) ABSTRACT

An exhaust system for an internal combustion engine includes an oxidation catalytic converter unit (12) with a first catalytic converter housing with a first housing axis ($A_1$). An SCR catalytic converter unit (18) has a second catalytic converter housing (20), with a second housing axis ($A_2$). A mixer housing (16) has an upstream connection area (24) adjoining a downstream end (26) of the first catalytic converter housing (14) and has a downstream connection area (28) adjoining an upstream end (30) of the second catalytic converter housing. A mixer (48) is carried in the mixer housing. A reactant release device (56) at the mixer housing releases reactant into a reactant-receiving duct (72) of the mixer. The mixer housing includes a first housing part (36) forming the upstream connection area (24) and a second housing part (38) forming the downstream connection area together with the first housing part.

20 Claims, 5 Drawing Sheets

(51) Int. Cl.
  F01N 13/18 (2010.01)
  B01D 53/94 (2006.01)
  B01F 3/04 (2006.01)
  B01F 5/04 (2006.01)
  B01F 5/06 (2006.01)

(52) U.S. Cl.
  CPC ...... B01D 53/9477 (2013.01); B01F 3/04021 (2013.01); B01F 5/0473 (2013.01); B01F 5/0605 (2013.01); F01N 3/2892 (2013.01); F01N 13/1805 (2013.01); F01N 2610/02 (2013.01); F01N 2610/1453 (2013.01)

(58) Field of Classification Search
  CPC .... B01F 5/0691; F01N 13/08; F01N 2240/20; F01N 2260/14; F01N 2470/02; F01N 2470/18; F01N 2610/02; F01N 2610/1453; F01N 3/2066; F01N 3/2892
  See application file for complete search history.

(56) References Cited

U.S. PATENT DOCUMENTS

| | | | |
|---|---|---|---|
| 10,436,095 B2* | 10/2019 | Greber | F01N 3/2892 |
| 2015/0330279 A1* | 11/2015 | Melecosky | B01D 53/9477 60/299 |
| 2016/0377033 A1* | 12/2016 | Ferront | F02M 26/15 60/295 |
| 2017/0089246 A1* | 3/2017 | Greber | B01F 5/0473 |
| 2017/0260888 A1* | 9/2017 | Solipuram | B01F 5/0688 |

FOREIGN PATENT DOCUMENTS

| | | |
|---|---|---|
| DE | 10 2014 206907 A1 | 10/2015 |
| DE | 10 2015 106 876 A1 | 11/2015 |
| DE | 20 2015 008560 U1 | 3/2017 |
| DE | 10 2016 114283 A1 | 2/2018 |
| EP | 3 216 992 A1 | 9/2017 |
| WO | 2017/206946 A1 | 12/2017 |

* cited by examiner

EXHAUST SYSTEM

CROSS REFERENCE TO RELATED APPLICATIONS

This application claims the benefit of priority under 35 U.S.C. § 119 of German Applications 10 2019 100 302.4, filed Jan. 8, 2019, and 10 2019 104 772.2, filed Feb. 26, 2019, the entire contents of which are incorporated herein by reference.

TECHNICAL FIELD

The present invention pertains to an exhaust system for an internal combustion engine, comprising an oxidation catalytic converter unit with a first catalytic converter housing elongated in the direction of a first housing axis, an SCR (Selective Catalytic Reduction) catalytic converter unit with a second catalytic converter housing elongated in the direction of a second housing axis; a mixer housing, which adjoins a downstream end of the first catalytic converter housing with an upstream connection area and an upstream end of the second catalytic converter housing with a downstream connection area; a mixer, which is arranged in the mixer housing and which is carried at the mixer housing; as well as a reactant release device carried at the mixer housing for releasing reactant into a reactant-receiving duct of the mixer.

TECHNICAL BACKGROUND

Such an exhaust system is known from EP 3 216 992 A1.

SUMMARY

An object of the present invention is to provide an exhaust system for an internal combustion engine especially in a vehicle, which exhaust system can be manufactured in a simple manner as well as with a complex shape.

This object is accomplished according to the present invention by an exhaust system for an internal combustion engine, comprising:
- an oxidation catalytic converter unit with a first catalytic converter housing elongated in the direction of a first housing axis,
- an SCR catalytic converter unit with a second catalytic converter housing elongated in the direction of a second housing axis,
- a mixer housing, which adjoins a downstream end of the first catalytic converter housing with an upstream connection area and an upstream end of the second catalytic converter housing with a downstream connection area,
- a mixer, which is arranged in the mixer housing and is carried at the mixer housing, and
- a reactant release device carried at the mixer housing for releasing reactant into a reactant-receiving duct of the mixer.

This exhaust system is characterized in that the mixer housing comprises a first housing part forming the upstream connection area and a second housing part, which is connected to the first housing part and forms the downstream connection area together with the first housing part.

Due to the mixer housing being configured with two housing parts, it becomes possible, on the one hand, to integrate the mixer into this housing in a simple manner, and, on the other hand, each of the housing parts can be provided with a comparatively complex geometry before these are connected to one another.

Provisions may be made for a stable connection of the two housing parts to one another for the first housing part to have a first connection edge area, for the second housing part to have a second connection edge area, and for one of the two connection edge areas to extend over the other connection edge area on the outer side of the housing part having the other connection edge area. The two connection edge areas are advantageously configured such that the two housing parts are connected to one another essentially in a connection plane.

It is proposed for a stable connection of the mixer housing to the two catalytic converter units that the upstream connection area have an upstream connection edge area extending over the first catalytic converter housing on the outer side thereof, or/and that the downstream connection area have a downstream connection edge area extending over the second catalytic converter housing on the outer side thereof, wherein a first partial area of the downstream connection edge area is formed at the first housing part and a second partial area of the downstream connection edge area is formed at the second housing part.

Each of the two partial areas of the downstream connection edge area may be dimensioned such that the two partial areas extend over the second catalytic converter housing in the circumferential direction in relation to the second housing axis to essentially the same extent, i.e., for example, in an angle range of about 180° each in relation to the second housing axis.

A very stable structure can be obtained by the second housing axis being located in a connection plane connecting the first housing part to the second housing part or extending parallel thereto. This means that the connection of the two housing parts to one another, on the one hand, and the connection of the mixer housing to the second catalytic converter housing, on the other hand, are embodied in planes that are essentially at right angles to one another.

For an optimized incoming flow to the mixer of the exhaust gas flowing through the oxidation catalytic converter unit, the first housing axis may extend sloped at an angle different from 90° in relation to a connection plane connecting the first housing part to the second housing part.

Provisions may be made for this purpose for the first housing axis to be sloped away from the second housing axis at an angle in the range of 93° to 100° in relation to the connection plane.

To connect the mixer and the reactant release device to the mixer housing, a carrier wall area extending essentially parallel to the first housing axis and a transition wall area extending away from the carrier wall area in the direction away from the downstream connection area may be provided at the second housing part.

Further, the transition wall area may extend from the carrier wall area to the second connection edge area essentially at right angles to the first housing axis. An indentation, in which the reactant release device positioned essentially outside the mixer housing can be accommodated at least partially and advantageously essentially completely for a compact configuration of the exhaust system, is thus created in the second housing part.

To ensure that essentially the total amount of the exhaust gas discharged by the internal combustion engine can be mixed with reactant, it is further proposed that a guide element guiding an exhaust gas stream leaving the downstream end of the first catalytic converter housing in the direction of the mixer be fixed at the mixer housing, preferably at the first housing part.

A configuration that can be manufactured in a simple and cost-effective manner yet is also stable under thermal load can be obtained if the first housing part and the second housing part are provided as shaped sheet metal parts and are connected to one another by connection in substance.

In the exhaust system configured according to the present invention, the mixer may comprise a disk-like or disk shaped mixer body with an essentially plate-like first mixer body part and with an essentially plate-like or plate shaped second mixer body part connected to the first mixer body part, wherein a bulge is formed in at least one of the mixer body parts for forming the reactant-receiving duct extending essentially in a reactant main injection direction, and wherein at least one bulge is formed in at least one of the mixer body parts for providing a reactant release duct extending away from the reactant-receiving duct.

Two bulges may be formed in at least one of the mixer body parts for providing two reactant release ducts extending away from the reactant-receiving duct in opposite directions in relation to one another for a uniform release of exhaust gas mixed with reactant.

The disk-like mixer body may be carried at the second housing part, arranged essentially at right angles to the first housing axis.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
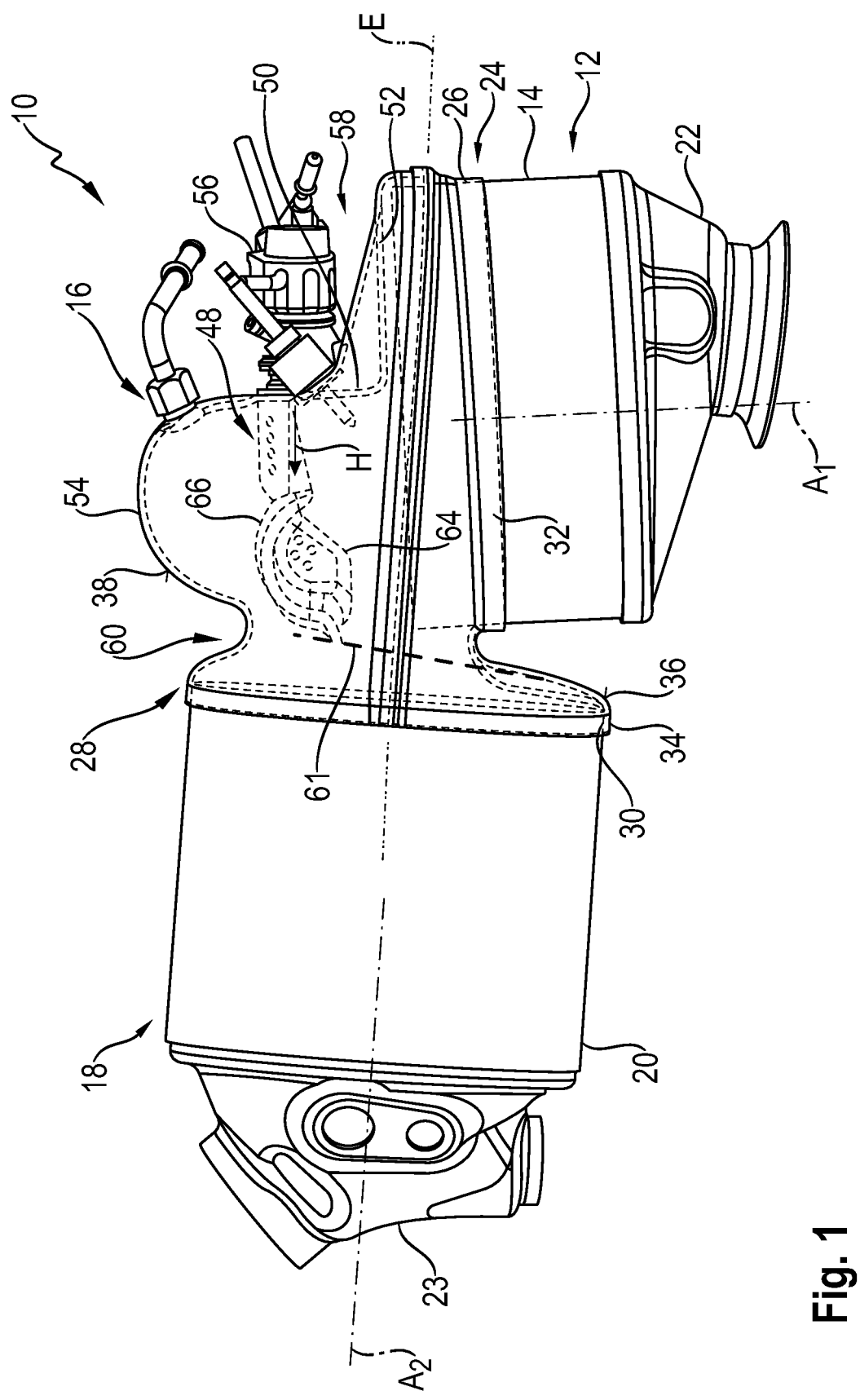
FIG. 1 is a side view of a part of an exhaust system for an internal combustion engine.
Figure 2:
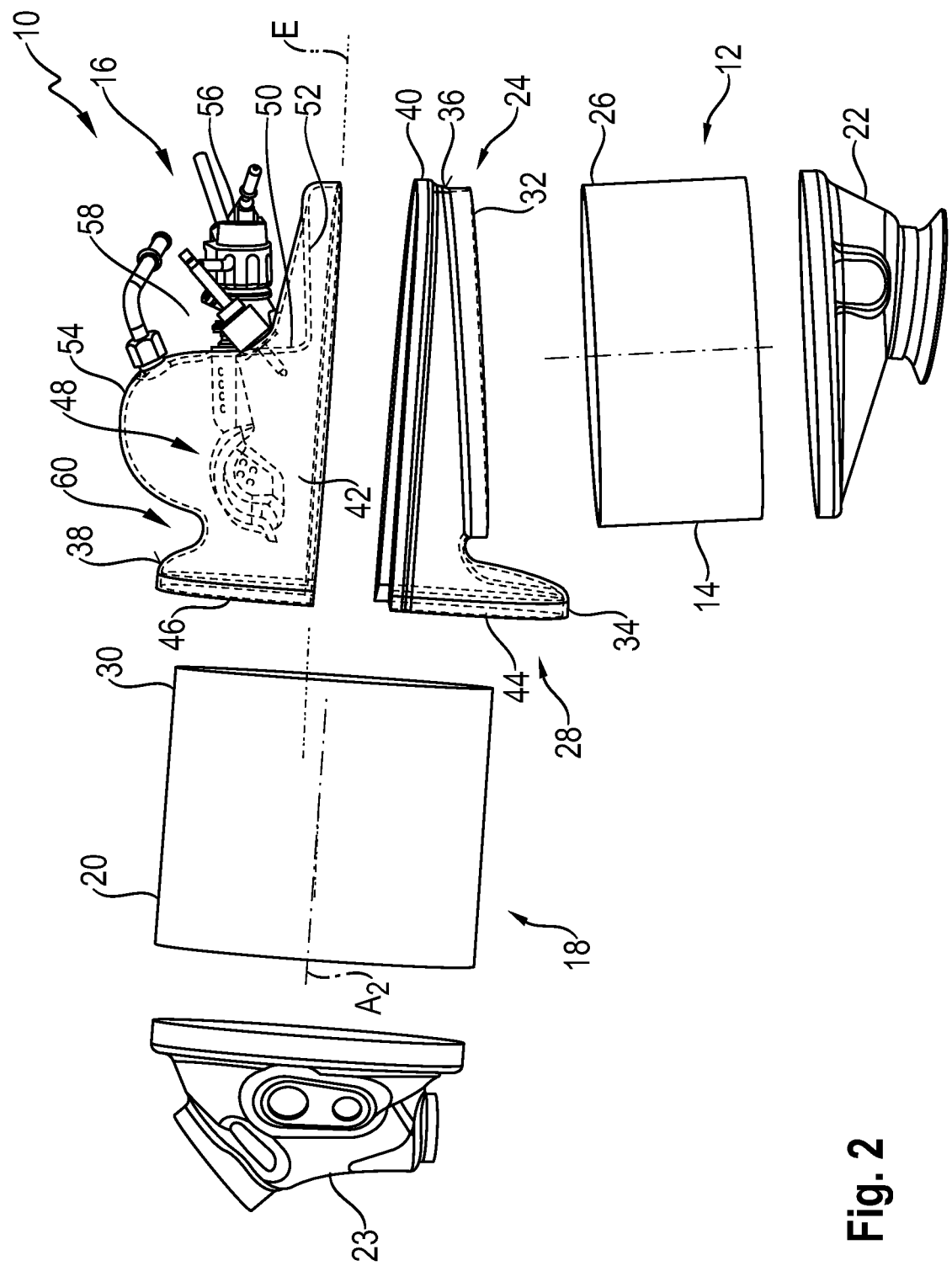
FIG. 2 is an exploded view showing a part of an exhaust system, which exhaust system part is shown in FIG. 1.
Figure 3:
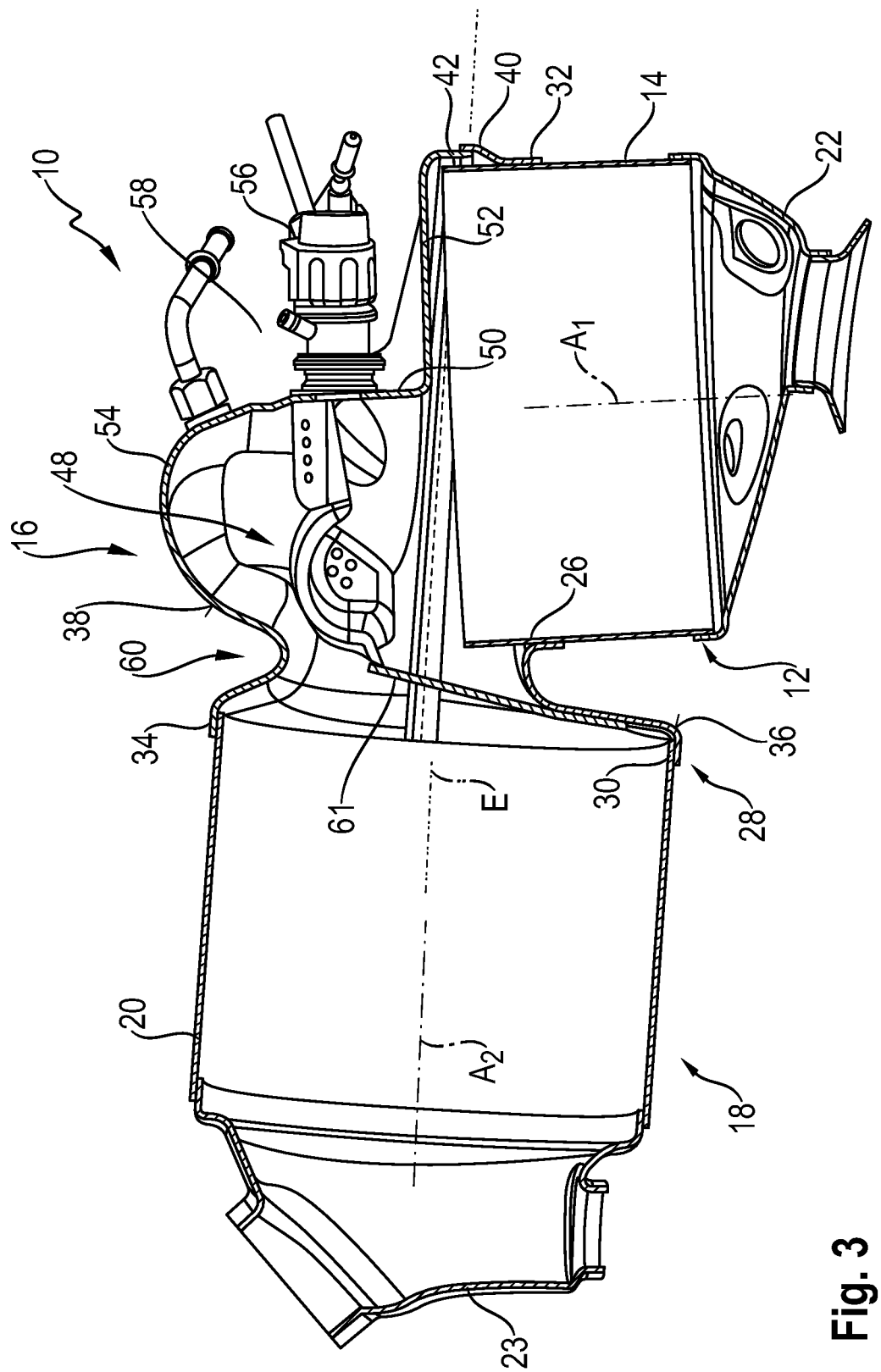
FIG. 3 is a partially cut-away view corresponding to FIG. 1.

Referring to the drawings, FIGS. 1 through 3 show a part of an exhaust system of an internal combustion engine, which exhaust system is generally designated by 10. This part of the exhaust system 10 comprises upstream an oxidation catalytic converter unit 12 with a, for example, essentially cylindrical first catalytic converter housing 14, which is elongated in the direction of a first housing axis $A_1$ and thus surrounds the first housing axis $A_1$. Upstream, the shown part of the exhaust system 10 comprises an SCR (Selective Catalytic Reduction) catalytic converter unit 18 with a second catalytic converter housing 20, which is elongated in the direction of a second housing axis $A_2$ and thus surrounds this housing axis $A_2$. The two housing axes $A_1$, $A_2$ may be respective central longitudinal axes of the first catalytic converter housing 14 and of the second catalytic converter housing 20. An oxidation catalytic converter, not shown, especially a diesel oxidation catalytic converter, may be arranged in the first catalytic converter housing 14. An SCR catalytic converter, likewise not shown, is accommodated in the second catalytic converter housing 20.

A mixer housing, generally designated by 16, is arranged between the two catalytic converter units 12, 18 or the two catalytic converter housings 14, 20. This mixer housing 16 provides a flow connection between the two catalytic converter units 12, 18. Respective connection elements 22, 23, via which the catalytic converter units 12, 18 can be connected to exhaust gas guiding components adjoining them, are provided at the end areas of the catalytic converter housings 14, 20, which end areas face away from the mixer housing 16.

The mixer housing 16 has an upstream connection area 24, with which this is connected to a downstream end 26 of the first catalytic converter housing 14. Further, the mixer housing 16 has a downstream connection area 28, with which this is connected to an upstream end 30 of the second catalytic converter housing 20.

The upstream connection area 24 comprises an essentially cylindrically shaped, upstream connection edge area 32, with which the mixer housing 16 extends over the downstream end 26 of the first catalytic converter housing 14 on the outer side thereof and is fixed to same, for example, by welding. The downstream connection area 28 likewise has a downstream connection edge area 34 with an essentially cylindrical shape, with which the mixer housing 16 extends over the upstream end 30 of the second catalytic converter housing 20 on the outer side thereof and is fixed to same, for example, by welding.

The mixer housing 16 is configured with two housing parts 36, 38. The two housing parts 36, 38 are connected to one another essentially in the area of a connection plane E, which may contain, as is shown in FIG. 1, for example, the second housing axis $A_2$ or is parallel to it. In particular, the arrangement may be such that the connection plane E is directed at right angles to a plane defined by the two housing axes $A_1$, $A_2$ and corresponds to the drawing plane of FIG. 1.

To connect the two housing parts 36, 38 to one another, the first housing part 36 forming the upstream connection area 24 has a first connection edge area 40. The second housing part 38 correspondingly has a second connection edge area 42. The first connection edge area 40 and the second connection edge area 42 may be coordinated with one another such that the first connection edge area 40 of the first housing part 36 extends over the second housing part 38 forming the second connection edge area 42 on the outer side thereof and is fixed to it, for example, by welding. Each of the two connection edge areas 40, 42 is essentially U-shaped and is not essentially curved in relation to the connection plane E. For example, the connection plane E may be defined, as can be seen in FIG. 2, by a lateral edge of the second connection edge area 42. The connection plane E could likewise be defined by a lateral edge of the first connection edge area 40.

Based on the configuration of the mixer housing 16 with the two housing parts 36, 38, a structure is obtained, in which the downstream connection area 28 or the downstream connection edge area 34 is divided into a first partial area 44 provided at the first housing part 36 and a partial area 46 provided at the second housing part 38. These two partial areas 44, 46 together form the downstream connection edge area 34, which extends without interruption about the second housing axis $A_2$. The configuration is advantageously such that each of the two partial areas 44, 46 extends surrounding the second catalytic converter housing 20 about the housing axis $A_2$ to the same extent, so that each of the two partial areas 44, 46 extends around the second catalytic converter housing 20 in the upstream end 30 thereof in an angle range of about 180°.

It can be further be seen in FIGS. 1 through 3 that the two housing axes $A_1$ and $A_2$ are not at right angles in relation to one another. The first housing axis $A_1$ is sloped in a direction away from the SCR catalytic converter unit 18 in relation to the second housing axis $A_2$ and also in relation to the connection plane E at an angle different from 90°. The two housing axes $A_1$ and $A_2$ may enclose between them an angle in the range of 93° to 100°.

A mixer, generally designated by 48, is carried at the mixer housing 16 or in the mixer housing 16. The mixer housing 16 has for this purpose a carrier wall area 50 extending approximately parallel to the first housing axis $A_1$. This carrier wall area 50 is also located approximately in the area of the first housing axis $A_1$ or of a radial center of the first catalytic converter housing 14. At its end located close to the first catalytic converter housing 14, the carrier wall area 50 passes over into a transition wall area 52. The transition wall area 52 extends, starting from its connection to the carrier wall area 50, in the direction away from the second catalytic converter housing 20 towards the second connection edge area 42. At an end located at a distance from the transition wall area 52, the carrier wall area 50 passes over into a calotte shell-like coupling area 54 of the second housing part 38, which coupling area 54 is arranged on a side of the mixer facing away from the first catalytic converter housing 14, essentially covering it completely.

Together with the mixer 48, a reactant release device 56, generally also called injector, is carried at the carrier wall area 50. The reactant release device 56 is located essentially outside the mixer housing 16 and is accommodated in an indentation 58 of the second housing part 38, which said indentation is formed by the carrier wall area 50 and by the transition wall area 52. This leads to a very compact configuration, in which the reactant release device 56 is accommodated essentially completely within the overall outer contour of the mixer housing 16 and does not substantially project over it.

Reactant, for example, a urea/water solution, is injected by the reactant release device into the mixer 48 in a reactant main injection direction H. The mixer 48 hereinafter described in detail with reference to FIGS. 4 through 6 mixes the exhaust gas flowing into the mixer housing 16 via the oxidation catalytic converter unit 12 with the reactant injected into the mixer 48 by the reactant release device 56 and leaves the mixer 48 or the mixer housing 16 as an efficiently mixed mixture of exhaust gas and reactant. The indentation 58, which is formed on the mixer housing 16 and through which the exhaust gas stream is guided radially inwards in the direction of the mixer 48 in relation to the first housing axis $A_1$, and the coupling area 54, which ensures swirling of the flow in an area downstream of and behind the mixer 48 and hence an efficient mixing of exhaust gas and reactant, contribute to this as well. The stream of a mixture of exhaust gas and reactant, which is thus formed, leaves the mixer housing 16 via a contraction area 60 formed between the coupling area 54 and the upstream connection area 24, on the one hand, and the downstream connection area 28, on the other hand, in the direction of the SCR catalytic converter unit 18. To guarantee that essentially the total amount of the exhaust gas leaving the catalytic converter housing 14 flows through the mixer 48, a guide element 61 made, for example, of a sheet metal material, is provided. This may be fixed, for example, to the housing part 36 of the mixer housing 16, which [housing part] is also connected to the catalytic converter housing 14, and close the flow space between the housing part 36 and the mixer 48. The guide element 61 may extend for this purpose starting from the housing part 36 to the mixer 48 and be supported at the end thereof, which end is located at a distance from the housing part 38. The exhaust gas stream leaving the catalytic converter housing 14 is deflected by the guide element 61 in the direction of the mixer 48, so that the exhaust gas enters into the mixer 48 and is mixed in this with reactant.

Figure 4:
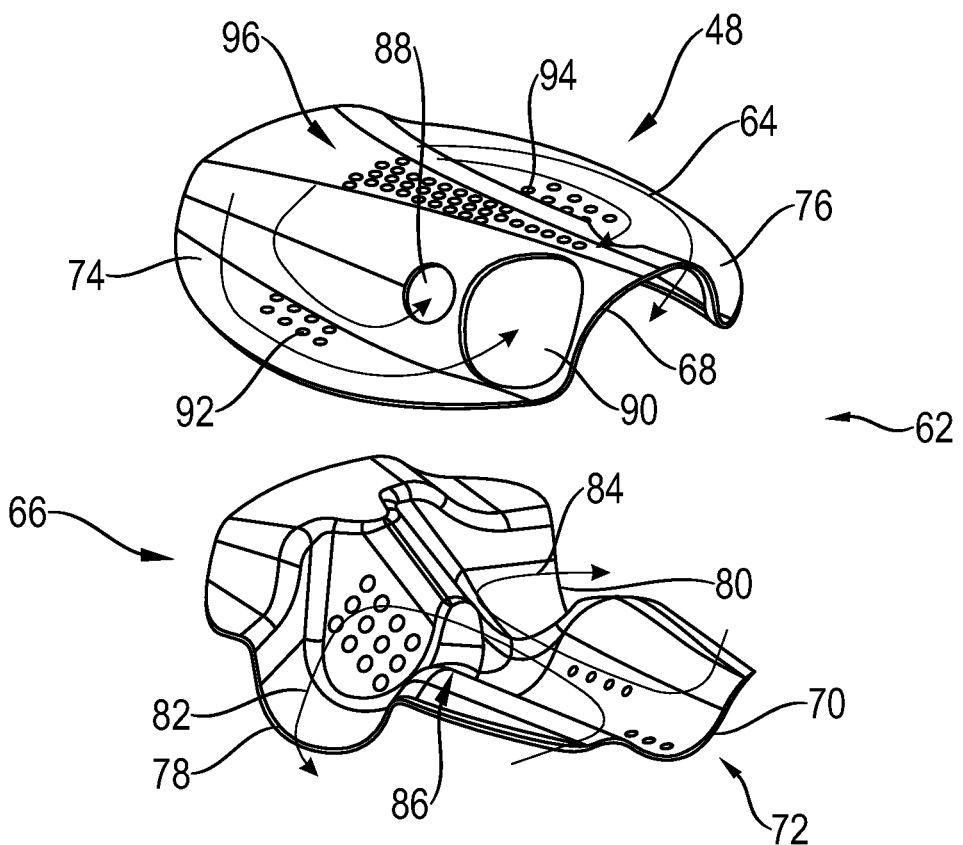
FIG. 4 is an exploded perspective view showing a mixer of the exhaust system shown in FIGS. 1 through 3.
Figure 5:
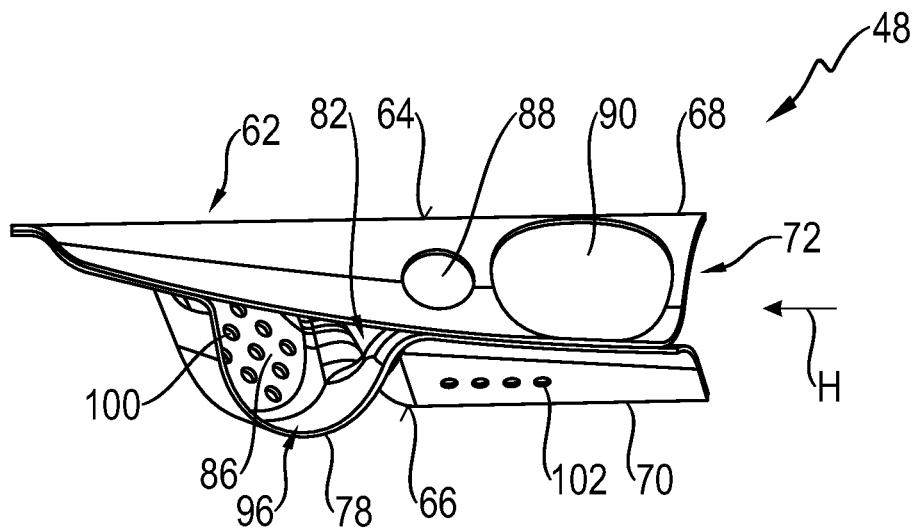
FIG. 5 is a side view showing the mixer.
Figure 6:
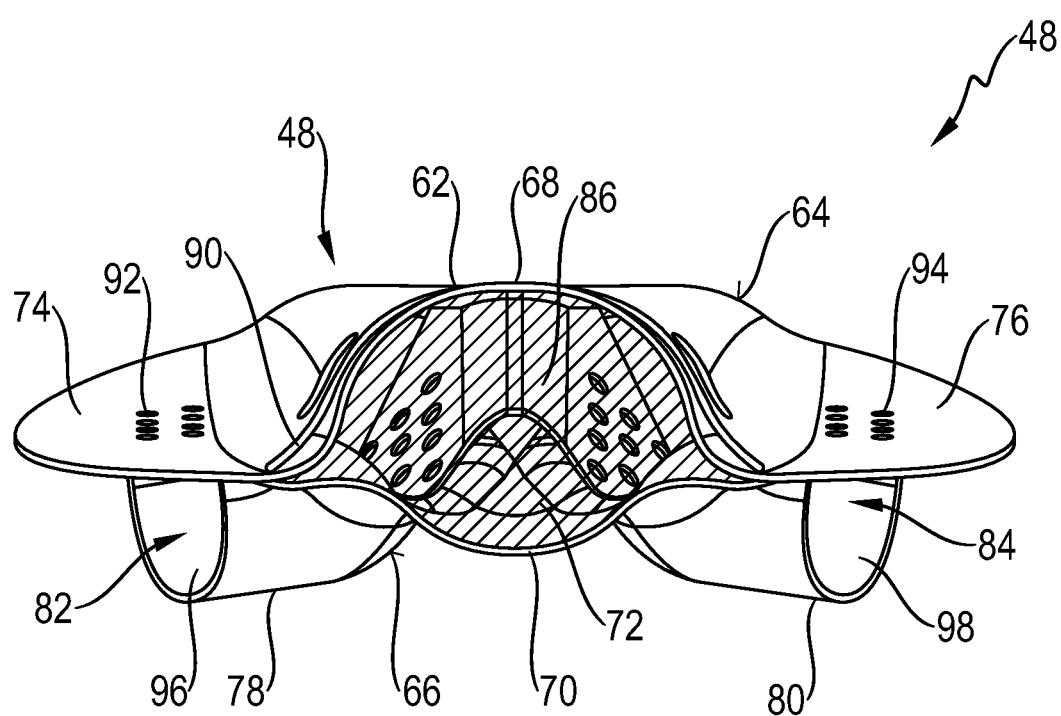
FIG. 6 is a side view showing the mixer in viewing direction VI in FIG. 5.

The mixer 48 shown in more detail in FIGS. 4 through 6 has a disk-like mixer body 62, which is configured with two plate-like mixer body parts 64, 66. A bulge 68 is formed in the first mixer body part 64, which is positioned in the upstream direction, i.e., facing the oxidation catalytic converter unit 12. A complementary bulge 70 is formed in the second mixer body part 66, which is positioned in the downstream direction, i.e., facing the coupling area 54. These two bulges form together a reactant-receiving duct 72, in which the reactant released from the reactant release device 56 is injected in the reactant main injection direction H. It should be noted that the reactant may be released, in principle, in the form of a spray cone, and the reactant main injection direction H may thus correspond essentially to a central axis of such a spray cone.

Essentially flat plate areas 74, 76, in which the first mixer body part 64 is connected to the second mixer body part 66, for example, by connection in substance, are provided at the first mixer body part 64 on both sides of the bulge 68. Two additional bulges 78, 80, which define a respective reactant release duct 82, 84 together with the plate areas 74, 76, are provided in the second mixer body part 66. The two reactant release ducts 82, 84 are open towards the reactant-receiving duct 72 in the area of a deflection area 86.

To make possible the entry of exhaust gas on the side oriented in the upstream direction, i.e., in the area of the first mixer body part 64, inlet openings 88, 90 of, for example, mutually different sizes are provided in the area of the bulge 68. Further, inlet openings 92, 94 are provided in the plate areas 74, 76 covering the reactant release ducts 82, 84. Inlet openings 96 may also be provided in the area of the bulge 68.

Outlet openings 96, 98 are provided, on the one hand, in the area of the reactant release ducts 82, 84 for the discharge of exhaust gas from the mixer 48. Further, outlet openings 100 are provided in the deflection area 86. Outlet openings 102 may be provided in the area of the bulge 70 as well.

With its disk-like (disk shaped) structure, the mixer body 62 provides a comparatively large incoming flow area for the exhaust gas leaving the oxidation catalytic converter unit 12. Exhaust gas can enter the interior of the mixer 48 via the different inlet openings and mix there with the reactant injected into the reactant-receiving duct 72. The mixture of exhaust gas and reactant, which is thus formed, leaves the mixer 48 via the different outlet openings essentially in the direction of the coupling area 54 of the mixer housing 16, is deflected there and reaches the SCR catalytic converter unit 18 via the contraction area 60. It is especially advantageous in this connection that the mixer 48 with the disk-like structure of the mixer body 62 is arranged essentially at right angles to the first housing axis $A_1$ and hence also approximately at right angles to a direction in which a majority of the exhaust gas leaving the oxidation catalytic converter unit 12 flows. In conjunction with the shape of the mixer housing 16, this leads to an efficient, uniform mixing of exhaust gas and reactant.

A configuration of the mixer housing 16 with a comparatively complex geometry, which can nevertheless be obtained with manufacturing operations that can be carried out in a simple manner, is obtained in the exhaust system 10 configured according to the present invention especially due to the configuration of the mixer housing 16 with the two housing parts 36, 38. Each of the two housing parts 36, 38 can be manufactured in itself by, for example, the shaping of a sheet metal blank. These two housing parts are connected in the connection edge areas 40, 42 extending over one another along a line located essentially in one plane, so that a welding operation may also be carried out in a very simple manner to prepare a weld seam. Since this connection line or the connection plane E is directed essentially at right angles to a plane or line in the area of which the second catalytic converter housing 20 is connected to the mixer housing 16, a highly stable structure leading to a uniform load distribution is obtained.

The exhaust system 10 being described here may be varied in different aspects. For example, in at least one of the connection areas 24, 28 of the mixer housing 16, the connection edge area 32, 34 provided there may not extend now with the respective catalytic converter housing 14 and 20 connected to this over the outer side thereof, but it may be inserted into the respective axial end 26 and 30 thereof. The two housing axes $A_1$, $A_2$ nay also be arranged at right angles in relation to one another, so that the first housing axis $A_1$ may also be, for example, at right angles to the connection plane E.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine, comprising:
    an oxidation catalytic converter unit with a first catalytic converter housing elongated in a direction of a first housing axis;
    an SCR catalytic converter unit with a second catalytic converter housing elongated in a direction of a second housing axis;
    a mixer housing being connected to a downstream end of the first catalytic converter housing with an upstream connection area and being connected to an upstream end of the second catalytic converter housing with a downstream connection area;
    a mixer arranged in the mixer housing and carried by the mixer housing; and
    a reactant release device carried on the mixer housing for releasing reactant into a reactant-receiving duct of the mixer,
    wherein the mixer housing comprises a first housing part forming the entire upstream connection area and a second housing part connected to the first housing part and forming the downstream connection area together with the first housing part.

2. The exhaust system in accordance with claim 1, wherein:
    the first housing part has a first connection edge area;
    the second housing part has a second connection edge area; and
    one of the first connection edge area and the second connection edge area extends over the other of the first connection edge area and the second connection edge area on an outer side of the housing part having the other of the first connection edge area and the second connection edge area.

3. The exhaust system in accordance with claim 1, wherein:
    the upstream connection area has an upstream connection edge area extending over the first catalytic converter housing on the outer side thereof; or
    the downstream connection area has a downstream connection edge area extending over the second catalytic converter housing on an outer side thereof, wherein a first partial area of the downstream connection edge area is provided at the first housing part and a second partial area of the downstream connection edge area is provided at the second housing part; or
    the upstream connection area has an upstream connection edge area extending over the first catalytic converter housing on the outer side thereof and the downstream connection area has a downstream connection edge area extending over the second catalytic converter housing on an outer side thereof, wherein a first partial area of the downstream connection edge area is provided at the first housing part and a second partial area of the downstream connection edge area is provided at the second housing part.

4. The exhaust system in accordance with claim 3, wherein the first partial area and the second partial area of the downstream connection edge area extend around the second catalytic converter housing in a circumferential direction in relation to the second housing axis to an essentially equal extent.

5. The exhaust system in accordance with claim 1, wherein the second housing axis is located in a connection plane, connecting the first housing part to the second housing part or extends parallel to the connection plane, connecting the first housing part to the second housing part.

6. The exhaust system in accordance with claim 1, wherein the first housing axis extends sloped at an angle different from 90° in relation to a connection plane, connecting the first housing part to the second housing part.

7. The exhaust system in accordance with claim 6, wherein the first housing axis is sloped away from the second housing axis in relation to the connection plane at an angle in the range of 93° to 100°.

8. The exhaust system in accordance with claim 1, wherein the mixer housing has a carrier wall area extending essentially parallel to the first housing axis and has a transition wall area extending from the carrier wall area in a direction away from the downstream connection area.

9. The exhaust system in accordance with claim 8, wherein
    the first housing part has a first connection edge area;
    the second housing part has a second connection edge area;
    one of the first connection edge area and the second connection edge area extends over the other of the first connection edge area and the second connection edge area on an outer side of the housing part having the other of the first connection edge area and the second connection edge area; and
    the transition wall area extends from the carrier wall area essentially at right angles to the first housing axis to the second connection edge area.

10. The exhaust system in accordance with claim 1, further comprising a guide element fixed at the mixer housing, the guide element guiding the exhaust gas stream leaving the downstream end of the first catalytic converter housing in a direction of the mixer.

11. The exhaust system in accordance with claim 10, wherein the guide is element fixed at the mixer housing.

12. The exhaust system in accordance with claim 1, wherein the first housing part and the second housing part are provided as shaped sheet metal parts and are connected to one another by welding.

13. The exhaust system in accordance with claim 1, wherein:
the mixer comprises a disk mixer body with an essentially plate-shaped first mixer body part and with an essentially plate-shaped second mixer body part connected to the first mixer body part;
a bulge is formed in at least one of the mixer body parts disposing the reactant-receiving duct extending essentially in a reactant main injection direction; and
at least one bulge is formed in at least one of the mixer body parts for providing a reactant release duct extending away from the reactant-receiving duct.

14. The exhaust system in accordance with claim 13, wherein two bulges are formed in at least one of the mixer body parts for providing two reactant release ducts extending from the reactant-receiving duct in mutually opposite directions.

15. The exhaust system in accordance with claim 13, wherein the plate-shaped mixer body is carried at the second housing part essentially at right angles to the first housing axis.

16. The exhaust system in accordance with claim 1, wherein:
the upstream connection area of the mixer housing is connected to the downstream end of the first catalytic converter housing;
the downstream connection area of the mixer housing is connected to the upstream end of the second catalytic converter housing.

17. The exhaust system in accordance with claim 1, wherein:
the mixer is directly supported by, and directly connected to, the mixer housing.

18. The exhaust system in accordance with claim 1, wherein:
the first housing part of the mixer housing forms an entirety of the upstream connection area.

19. An exhaust system for an internal combustion engine, comprising:
an oxidation catalytic converter unit with a first catalytic converter housing elongated in a direction of a first housing axis;
an SCR catalytic converter unit with a second catalytic converter housing elongated in a direction of a second housing axis;
a mixer housing adjoining a downstream end of the first catalytic converter housing with an upstream connection area and adjoining an upstream end of the second catalytic converter housing with a downstream connection area;
a mixer arranged in the mixer housing and carried at the mixer housing; and
a reactant release device carried on the mixer housing for releasing reactant into a reactant-receiving duct of the mixer,
wherein the mixer housing comprises a first housing part forming the upstream connection area and a second housing part connected to the first housing part and forming the downstream connection area together with the first housing part,
wherein the mixer housing has a carrier wall area extending essentially parallel to the first housing axis and has a transition wall area extending from the carrier wall area in a direction away from the downstream connection area, and wherein:
the first housing part has a first connection edge area;
the second housing part has a second connection edge area;
one of the first connection edge area and the second connection edge area extends over the other of the first connection edge area and the second connection edge area on an outer side of the housing part having the other of the first connection edge area and the second connection edge area; and
the transition wall area extends from the carrier wall area essentially at right angles to the first housing axis to the second connection edge area.

20. An exhaust system for an internal combustion engine, comprising:
an oxidation catalytic converter unit with a first catalytic converter housing elongated in a direction of a first housing axis;
an SCR catalytic converter unit with a second catalytic converter housing elongated in a direction of a second housing axis;
a mixer housing adjoining a downstream end of the first catalytic converter housing with an upstream connection area and adjoining an upstream end of the second catalytic converter housing with a downstream connection area;
a mixer arranged in the mixer housing and carried at the mixer housing; and
a reactant release device carried on the mixer housing for releasing reactant into a reactant-receiving duct of the mixer, wherein the mixer housing comprises a first housing part forming the upstream connection area and a second housing part connected to the first housing part and forming the downstream connection area together with the first housing part,
wherein:
the upstream connection area of the mixer housing is connected to the downstream end of the first catalytic converter housing;
the downstream connection area of the mixer housing is connected to the upstream end of the second catalytic converter housing;
the mixer is directly supported by, and directly connected to, the mixer housing;
the first housing part of the mixer housing forms an entirety of the upstream connection area.

* * * * *